(12) United States Patent
Mellor

(10) Patent No.: US 8,695,773 B2
(45) Date of Patent: Apr. 15, 2014

(54) WRAP SPRING CLUTCH COUPLING WITH FORCED SPRING CLEARANCE DISENGAGEMENT

(75) Inventor: Patricia M. Mellor, Winsted, CT (US)

(73) Assignee: Inertia Dynamics LLC, New Hartford, CT (US)

( * ) Notice: Subject to any disclaimer, the term of this patent is extended or adjusted under 35 U.S.C. 154(b) by 504 days.

(21) Appl. No.: 12/968,972

(22) Filed: Dec. 15, 2010

(65) Prior Publication Data

US 2012/0152691 A1 Jun. 21, 2012

(51) Int. Cl.
*F16D 13/08* (2006.01)
*F16D 41/20* (2006.01)

(52) U.S. Cl.
USPC .................................. 192/81 C; 192/41 S

(58) Field of Classification Search
USPC ................... 192/35, 12 BA, 41 S, 81 C, 33 C
See application file for complete search history.

(56) References Cited

U.S. PATENT DOCUMENTS

| | | |
|---|---|---|
| 2,971,394 A | 2/1961 | Christensen |
| 3,307,668 A | 3/1967 | Conlon |
| 3,915,268 A | 10/1975 | MacDonald |
| 6,047,805 A | 4/2000 | Nyquist et al. |
| 6,488,133 B1 | 12/2002 | Maurice et al. |
| 2005/0236245 A1 | 10/2005 | Maurice et al. |

OTHER PUBLICATIONS

"Wrap Spring Clutches", Inertia Dynamics LLC, 37 pgs.
U.S. Appl. No. 12/868,007 (Aug. 25, 2010).
International Search Report issued in corresponding PCT Patent Application No. PCT/US2011/064649 (Mar. 12, 2012).
Written Opinion issued in corresponding PCT Patent Application No. PCT/US2011/064649 (Mar. 12, 2012).

*Primary Examiner* — David D Le
*Assistant Examiner* — Stacey Fluhart
(74) *Attorney, Agent, or Firm* — Dykema Gossett PLLC

(57) ABSTRACT

A rotational coupling is provided. The coupling includes first and second hubs disposed about an axis of rotation. A wrap spring is disposed radially outwardly of the hubs and rotatably couples the hubs upon rotation of the first hub in a first rotational direction. A spring actuation member is configured for rotation about the axis and coupled to one end of the wrap spring. The opposite end of the wrap spring is coupled to the second hub. An actuator is configured to selectively stop rotation of the spring actuation member and the second hub in the first rotational direction and cause rotation of the spring actuation member in a second rotational direction to thereby unwrap the wrap spring. The rotational coupling therefore facilitates disengagement of the wrap spring from the first hub during release of the coupling to prevent undue noise and vibration and reduce wear.

20 Claims, 2 Drawing Sheets

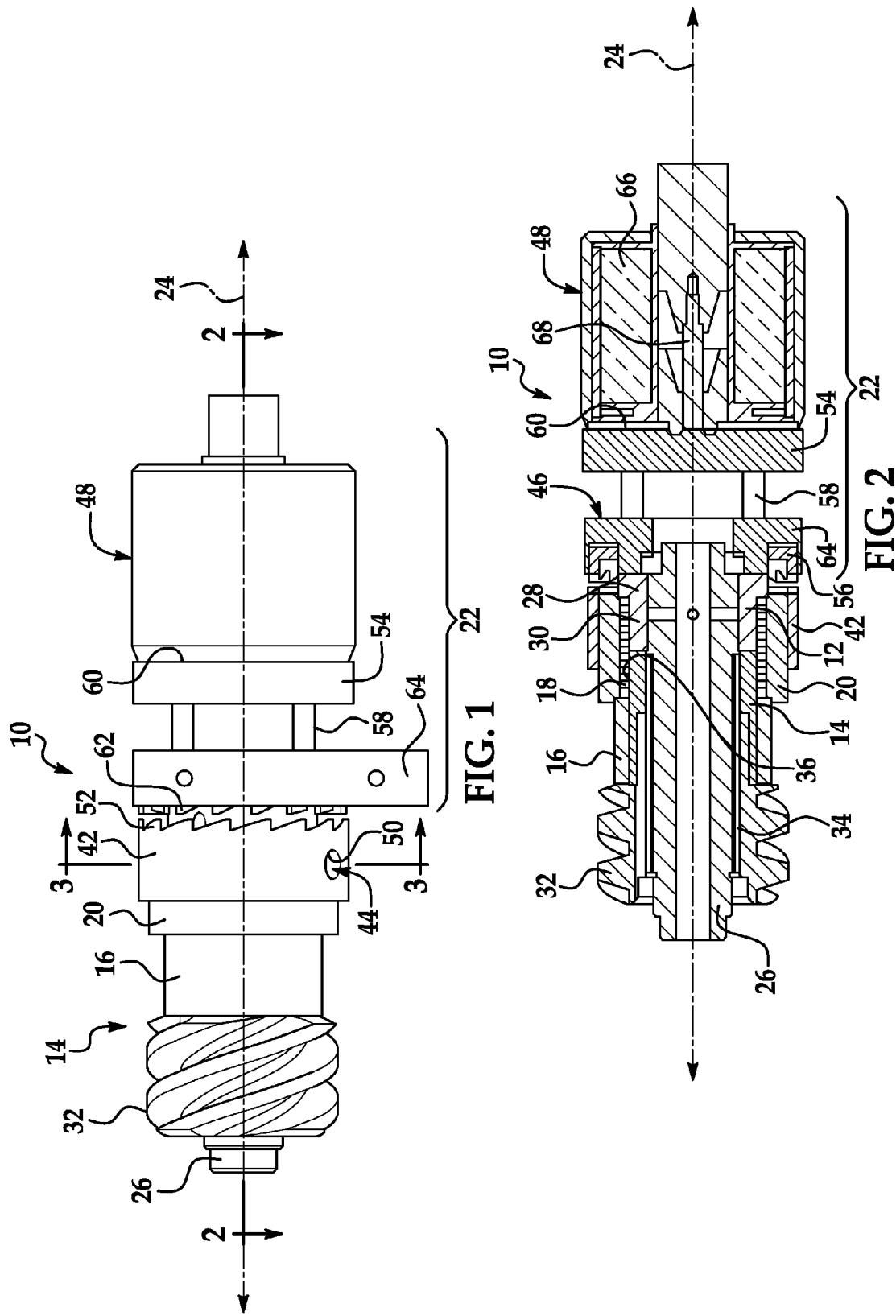

WRAP SPRING CLUTCH COUPLING WITH FORCED SPRING CLEARANCE DISENGAGEMENT

BACKGROUND OF THE INVENTION

1. Field of the Invention

This invention relates to rotational couplings and, in particular, to a wrap spring clutch having features to assist disengagement of the wrap spring upon release of the clutch.

2. Discussion of Related Art

A conventional wrap spring clutch includes an input hub and an output hub. A wrap spring is coupled to one of the input and output hubs by an interference fit. When rotation of the hub to which the wrap spring is connected in a first rotational direction causes the spring to tighten down upon the other hub thereby coupling the two hubs together for rotation and engaging the clutch. The spring is unwrapped, and the clutch released, when the hub to which the wrap spring is coupled stops or reverses direction or as the result of an external force that prevents rotation of the wrap spring.

The operation of a wrap spring clutch depends on differences in rotational speed among the input and output hubs. In particular, the wrap spring will engage and disengage more quickly when there are large difference in rotational speed among the hubs. In many applications, however, the differences in rotational speed during engagement and disengagement of the clutch are relatively low. As a result, the wrap spring may cause an undesirable drag on the hub on which it has been wrapped during clutch disengagement and generate unwanted noise and vibration. The wrap spring is also susceptible to increased wear as a result. Wrap spring clutches are therefore often unsuitable for applications in which the differences in rotational speed among the hubs are relatively low. Conventional wrap spring clutches attempt to overcome these issues by adjusting the interference fit of the wrap spring to the hubs. Adjusting the interference fit, however, requires a delicate balance to permit both clutch engagement (which can be compromised if there is insufficient interference) and disengagement (which can be compromised if there is too much interference). In many applications, a proper balance cannot be obtained and conventional wrap spring clutches cannot be used.

The inventors herein have recognized a need for a rotational coupling that will minimize and/or eliminate one or more of the above-identified deficiencies.

SUMMARY OF THE INVENTION

The present invention provides a rotational coupling.

A rotational coupling in accordance with one embodiment of the present invention includes first and second hubs disposed about an axis of rotation. The coupling further includes a wrap spring disposed radially outwardly of the first and second hubs. The wrap spring is configured to couple the first and second hubs together for rotation during rotation of the first hub in a first rotational direction. The coupling further includes a spring actuation member configured for rotation about the axis and coupled to a first end of the wrap spring. In one embodiment of the invention, the spring actuation member comprises a collar disposed radially outwardly of the wrap spring. A second end of the wrap spring is coupled to the second hub. The coupling further includes an actuator configured to stop rotation of the spring actuation member and the second hub in the first rotational direction and cause rotation of the spring actuation member in a second rotational direction opposite the first rotational direction to thereby unwrap the wrap spring.

A rotational coupling in accordance with the present invention represents an improvement relative to conventional rotational couplings and, in particular, conventional wrap spring clutches. By providing a mechanism that facilitates unwinding of the wrap spring independent of the relative rotation of the hubs, the inventive coupling facilitates release of the wrap spring even in applications in which the difference in rotational speed among the hubs is low. As a result, the inventive coupling can be used in additional applications previously considered unsuitable for a wrap spring clutch.

These and other advantages of this invention will become apparent to one skilled in the art from the following detailed description and the accompanying drawings illustrating features of this invention by way of example.

BRIEF DESCRIPTION OF THE DRAWINGS

FIG. 1 is a plan view of a rotational coupling in accordance with one embodiment of the present invention.

FIG. 2 is a cross-sectional view of the rotational coupling of FIG. 1 taken along lines 2-2.

DETAILED DESCRIPTION OF EMBODIMENTS OF THE INVENTION

Figure 3:
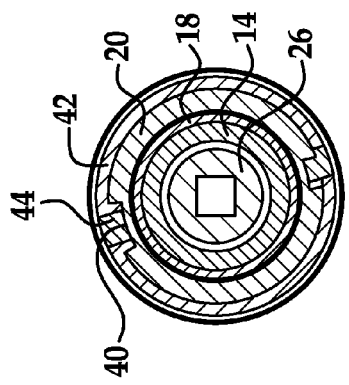
FIG. 3 is a cross-sectional view of the rotational coupling of FIG. 1 taken alone lines 3-3.

Referring now to the drawings wherein like reference numerals are used to identify identical components in the various views, FIGS. 1-4 illustrate a rotational coupling 10 in accordance with one embodiment of the present invention. Coupling 10 functions as a clutch to selectively transfer torque between input and output members such as shafts, pulleys, gears, sprocket and sheaves (not shown). Coupling 10 may also function as a brake on the output member when torque is not being transferred to the output member. In the illustrated embodiment, coupling 10 functions as a start/coast (or start/stop) clutch. It should be understood, however, that the invention could be used in other clutches such as overrunning/one-way clutches and single revolution clutches as well as clutch/brake combinations including any of the SC and WSC mechanical series clutches and/or CP and SAC actuated clutch series and/or DCB, CB and Super actuated clutch-brakes sold by Altra Industrial Motion, Inc. under the trademarks "DYNACORP" and/or "WARNER ELECTRIC." Coupling 10 may include an input hub 12, an output hub 14, means, such as one way bearing 16, for preventing rotation of output hub 14 in one rotational direction, a wrap spring 18, a spring actuation member 20, and an actuator 22.

Input hub 12 provides a means for transferring torque from an input device such as a shaft, pulley, gear, sprocket or sheave to output hub 14 through wrap spring 18. Hub 12 is conventional in the art and may be made from conventional metals and metal alloys and may, for example comprise an oil impregnated sintered iron hub. Hub 12 is annular and is disposed about a rotational axis 24 In the illustrated embodiment, hub is disposed about an input shaft 26 and is rotatably coupled to shaft 26. Hub 12 may be joined to shaft 26 using a conventional key/keyway relationship or in another conventional manner. Hub 12 includes a portion 28 disposed at one axial end and a portion 30 having a reduced diameter relative to portion 28. It should be understood, however, that the configuration of hub 12 may vary depending on the application. Portion 28 is configured to limit axial movement of wrap spring 18 and actuation member 20. Portion 30 is configured to support a portion of wrap spring 18.

Output hub 14 provides a means for transferring torque from input hub 12 to an output member such as a shaft, pulley, gear, sprocket or sheave. In the illustrated embodiment, hub 14 transfers torque to gear 32. Although the illustrated embodiment is configured for a shaft input member and a gear output member, it should be understood that this relationship could be reversed and that hubs 12, 14 could be configured for attachment to a variety of input and output members. Hub 14 is conventional in the art and may be made from conventional metals and metal alloys and may, for example comprise an oil impregnated sintered iron hub. Hub 14 is annular and is disposed about axis 24 and may be coaxially aligned with input hub 12. Hub 14 and gear 32 are sized to receive input shaft 26 which extends therethrough along with a bearing sleeve 34 disposed between shaft 26 and hub 14 and between shaft 26 and gear 32. A radially outer surface 36 of hub 14 provides an engagement surface for wrap spring 18 upon engagement of the clutch. When the clutch is not engaged, input hub 12 and output hub 14 are capable of relative rotation.

One way bearing 16 provides a means for preventing rotation of output hub 14 in one rotational direction (i.e. in a direction opposite the driving direction of the clutch). Bearing 16 is conventional in the art. Bearing 16 is annular and is disposed about axis 24. Bearing 16 is disposed radially outwardly of output hub 14 and axially between gear 32 on the one hand and spring 18 and actuation member 20 on the other hand. Although bearing 16 is used in the illustrated embodiment to prevent reverse rotation of output hub 14, it should be understood that other mechanisms could be used to accomplish the same result including, for example, a pawl and ratchet, an anti-rotation spring, a cam, or a brake band as well as friction within the drive system such the torque required to reverse rotation of hub 14 exceeds the torque required to open spring 18.

Wrap spring 18 is provided to couple input and output hubs 12, 14 together for rotation. Wrap spring 18 is conventional in the art and may be made from conventional metal and metal alloys. Spring 18 has an inner diameter that is slightly smaller than the outer diameter of portion 28 of input hub 12 and surface 36 of output hub 14. Accordingly, spring 18 may engage hubs 12, 14 in an interference fit. Rotation of hub 12 in one rotational direction (the "driving" direction) causes spring 18 to wrap down tightly onto hub 14 to couple hubs 12, 14 together for rotation thereby transferring torque from input hub 12 to output hub 14. When rotation of hub 12 ends or hub 12 is rotated in the opposite rotational direction, or when rotation of output hub 14 is stopped, spring 18 unwraps to uncouple hubs 12, 14 and disengage the clutch. Although spring 18 engages output hub 14 directly in the illustrated embodiment, it should be understood that spring 18 could wrap down upon an intermediary member to indirectly engage output hub 14. Further, although spring 18 wraps down upon output hub 14 in the illustrated embodiment, it will be understood by those of skill in the art that spring 18 could alternatively be oriented such that spring 18 wraps down upon input hub 12 during clutch engagement and unwinds from input hub 12 during release of the clutch. Spring 18 is coupled at one end to spring actuation member 20 and may include a tang 38 that extends into a corresponding recess in member 20. Spring 18 is coupled at the opposite end to hub 14 and may include another tang (not shown) extending into a corresponding recess in hub 14. Again, it should be understood that spring 18 may be coupled to hub 12 as opposed to hub 14 in an alternate embodiment.

Figure 4:
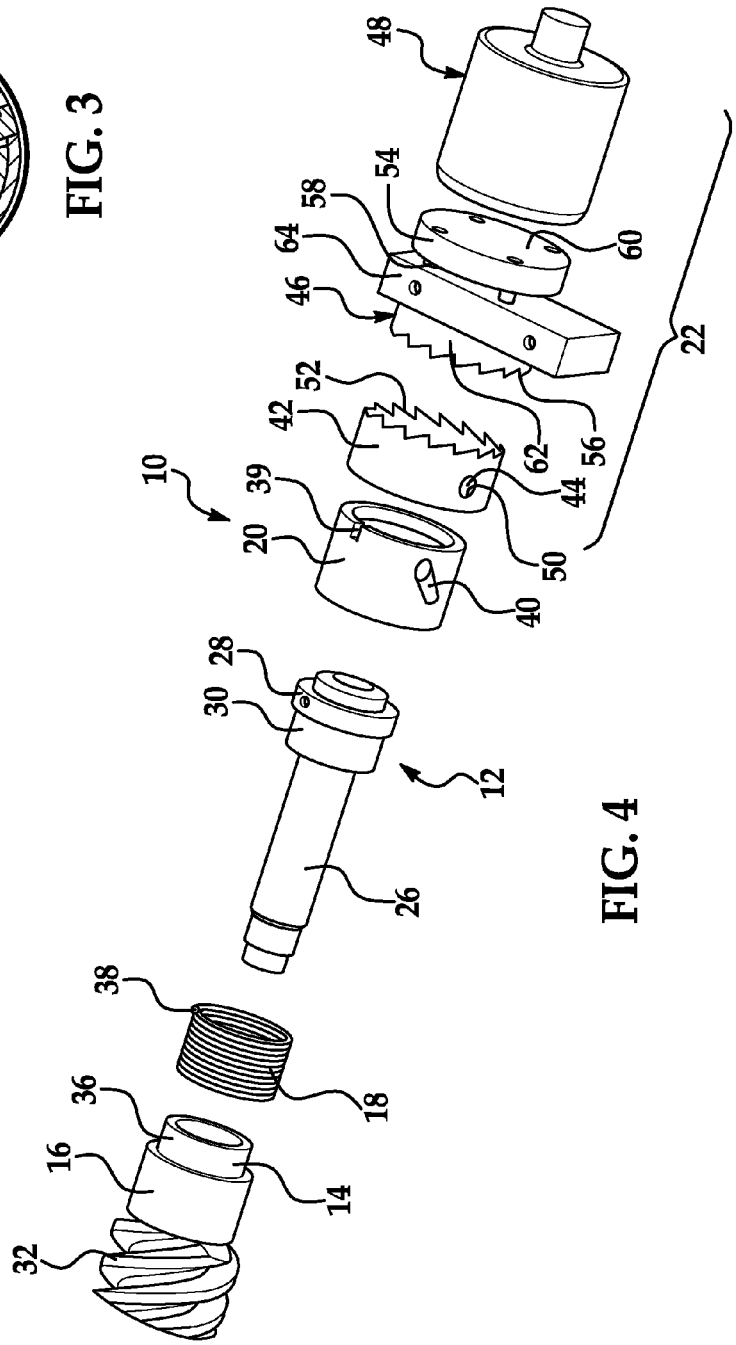
FIG. 4 is an exploded perspective view of the rotational coupling of FIG. 1.

Spring actuation member 20 provides a means for controlled disengagement of the clutch apart from relative rotation of input hubs 12, 14. In the illustrated embodiment, member 20 comprises a collar disposed radially outwardly of spring 18. Member 20 may be made from glass-reinforced nylon with steel or aluminum inserts. Member 20 is annular in shape and is disposed about axis 24, coaxially aligned with hubs 12, 14. Member 20 is sized to be received between portion 28 of input hub 12 and one way bearing 16 upon assembly of coupling 10 and may contact one axial end face of portion 26 and bearing 16. Member 20 is disposed radially outwardly of wrap spring 18 and has an inner diameter sized to permit a predetermined spacing relative to spring 18. Member 20 includes a slot 39 or similar structure configured to receive tang 38 on spring 18. Member 20 has an outer diameter that may be greater than the outer diameter of portion 26 of hub 12 and bearing 16. Referring to FIGS. 3-4, a radially outer surface of member 20 defines one or more helical slots 40 for a purpose described hereinbelow. Slots 40 may be equally circumferentially spaced on the outer surface of member 20. In the illustrated embodiment, member 20 includes two slots 40 diametrically opposite one another. Although member 20 comprises an annular collar in the illustrated embodiment, it should be understood that member 20 could assume a variety of structural forms sufficient to retain one end of spring 18 and allow for rotational movement of spring 18 as described in greater detail hereinbelow including, for example, a linkage, cam or rod.

Actuator 22 provides a means for stopping rotation of spring actuation member 20 and output hub 14 in one rotational direction (i.e. the driving direction in which the clutch is engaged and input and output hubs 12, 14 are rotatably coupled) and for causing rotation of member 20 in the opposite rotational direction to thereby unwrap spring 18. Actuator 22 may include a collar 42, pins 44, an actuator ring 46, and means, such as solenoid 48, for moving ring 46 into engagement with collar 42.

Collar 42 is configured to impart a braking torque to member 20 to stop rotation of member 20 (and therefore output hub 14 through spring 18) in one rotational direction (the driving direction of the clutch) and to apply a reverse torque to urge member 20 in the opposite rotational direction. Collar 42 may be made from glass-reinforced nylon with steel or aluminum inserts. Collar 42 is annular in shape and is disposed about axis 24. Collar 42 has an inner diameter sized to receive member 20. Collar 42 includes one or more radial bores 50 extending therethrough configured to receive pins 44 that may be press fit or molded within bores 50. Collar 42 also defines a plurality of axially extending teeth 52 at one axial end for a purpose described below.

Pins 44 are provided to translate linear movement of collar 42 along axis 24 into rotational torque and, in particular, a braking torque used to stop rotational movement of member 20 (and, therefore output hub 14 through spring 18) in one rotational direction (the driving direction of the clutch) and a reverse torque used to cause rotational movement of member 20 in the opposite direction to unwind spring 18. Pins 44 may be made from conventional metals and metal alloys or plastics. Pins 44 are shaped to be received within bores 50 of collar 42 and within slots 40 of member 20 and are circular in cross section in the illustrated embodiment. Pins 44 have length that is greater than the distance between the inner and outer diameters of collar 42 such that pins 44 extend radially inwardly beyond the inner diameter of collar 42 into corresponding slots 40. As with slots 40, pins 44 may be equally circumferentially spaced. In the illustrated embodiment, two pins 44 are located diametrically opposite one another.

Ring 46 is provided to transmit a braking torque to collar 42 to stop rotational movement of collar 42 and, further, to move collar 42 in an axial direction for a purpose described hereinbelow. Ring 46 includes first and second members 54, 56 disposed at opposite axial ends and connected to one another by a plurality of axially extending pins 58. Member 54 defines a surface 60 at one axial end configured for engagement by solenoid 48. Member 56 defines a plurality of axially extending teeth 62 at an opposite axial end configured to engage teeth 52 on collar 42. Pins 58 extend through axially extending bores in a stationary enclosure 64 (shown in FIG. 1) such that ring 46 is axially movable, but rotationally stationary. As a result, when teeth 62 are moved into engagement with teeth 52 of collar 42, further rotation of collar 42 in the driving direction and—through the interaction of pins 44 and slots 40—member 20, will be prevented.

Solenoid 48 is provided to control the position of ring 46 along axis 24 and to selectively urge ring 46 towards collar 42 and into engagement with collar 42. Solenoid 48 is conventional in the art. Referring to FIG. 2, generation of an electric field in a wound conductor 66 causes linear movement of a plunger 68 into and out of engagement with surface 60 of ring 46 to control movement of ring 46 along axis 24. Although the illustrated embodiment of coupling 10 employs a solenoid 48, it should be understood that a variety of means adjusting the position of ring 46 and moving ring 46 into engagement with collar 42 may be provided including, for example, fluid controlled actuators (e.g., hydraulic and pneumatic actuators), electrically controlled actuators, and manually control actuators.

Referring to FIGS. 2-4, the operation of coupling 10 will now be described in greater detail. Rotation of input shaft 26 in one rotational direction (i.e., the driving direction of the clutch) causes corresponding rotation of input hub 12 and further causes spring 18 to wrap down upon surface 36 of output hub 14 to rotatably couple hubs 12, 14 and engage the clutch. When it is desirable to disengage the clutch, solenoid 48 urges ring 46 towards collar 42. Engagement of teeth 62 on ring 46 with teeth 52 of collar 42 results in application of a braking torque to collar 42 to prevent further rotation of collar 42 in the driving rotational direction. Pins 44 transfer this braking torque to member 20 to stop rotation of member 20. Similarly, the braking torque is applied from member 20 to output hub 14 through spring 18. The engagement of ring 46 and collar 42 (through teeth 62 and teeth 52, respectively) and the continued application of force in an axial direction by solenoid 48 causes pins 44 to move along slots 40 and causes rotation of member 20 in a direction opposite to the driving direction of the clutch. Output hub 14 is prevented from rotation in the direction opposite to the driving direction of the clutch by bearing 16. As a result, spring 18—which is coupled at opposite ends to member 20 and hub 14—unwraps.

A rotational coupling in accordance with the present invention represents an improvement over conventional rotational couplings and, in particular, conventional wrap spring clutches. By providing a mechanism that facilitates unwinding of the wrap spring 18 independent of the relative rotation of the hubs 12, 14, the inventive coupling 10 facilitates release of the wrap spring 18 even in applications in which the difference in rotational speed among the hubs 12, 14 is low. As a result, the inventive coupling 10 can be used in additional applications previously considered unsuitable for a wrap spring clutch While the invention has been shown and described with reference to one or more particular embodiments thereof, it will be understood by those of skill in the art that various changes and modifications can be made without departing from the spirit and scope of the invention.

We claim:

1. A rotational coupling, comprising:
   first and second hubs disposed about an axis of rotation;
   a wrap spring disposed radially outwardly of said first and second hubs, said wrap spring configured to couple said first and second hubs together for rotation during rotation of said first hub in a first rotational direction,
   a spring actuation member configured for rotation about said axis and coupled to a first end of said wrap spring, a second end of said wrap spring coupled to said second hub; and,
   an actuator configured to selectively stop rotation of said spring actuation member and said second hub in said first rotational direction relative to said actuator and cause rotation of said spring actuation member in a second rotational direction relative to said actuator and opposite said first rotational direction to thereby unwrap said wrap spring.

2. The rotational coupling of claim 1 wherein said first hub comprises an input hub and said second hub comprises an output hub.

3. The rotational coupling of claim 1 wherein said spring actuation member comprises a first collar disposed radially outwardly of said wrap spring.

4. The rotational coupling of claim 3, wherein said actuator includes
   a second collar disposed radially outwardly of said first collar and axially movable relative to said first collar; and
   a first pin extending radially inwardly from said second collar and configured to be received within a first slot formed in a radially outer surface of said first collar.

5. The rotational coupling of claim 4 wherein said first slot is helical.

6. The rotational coupling of claim 4 wherein said actuator further includes a second pin extending radially inwardly from said second collar and configured to be received within a second slot formed in a radially outer surface of said first collar.

7. The rotational coupling of claim 6 wherein said first and second slots are helical.

8. The rotational coupling of claim 6 wherein said first and second pins are diametrically opposite one another.

9. The rotational coupling of claim 4 wherein said second collar defines a first plurality of teeth at one axial end configured to engage a second plurality of teeth disposed on an actuator ring upon movement of said ring along said axis.

10. The rotational coupling of claim 9 wherein said actuator includes means for moving said actuator ring into engagement with said second collar.

11. A rotational coupling, comprising:
    first and second hubs disposed about an axis of rotation;
    a wrap spring disposed radially outwardly of said first and second hubs, said wrap spring configured to couple said first and second hubs together for rotation during rotation of said first hub in a first rotational direction,
    a spring actuation member configured for rotation about said axis and coupled to a first end of said wrap spring, a second end of said wrap spring coupled to said second hub; and,
    means for stopping rotation of said spring actuation member and said second hub in said first rotational direction and causing rotation of said spring actuation member in a second rotational direction opposite said first rotational direction to thereby unwrap said wrap spring.

12. The rotational coupling of claim 11 wherein said first hub comprises an input hub and said second hub comprises an output hub.

13. The rotational coupling of claim 11 wherein said spring actuation member comprises a first collar disposed radially outwardly of said wrap spring.

14. The rotational coupling of claim 13, wherein said stopping means includes
   a second collar disposed radially outwardly of said first collar and axially movable relative to said first collar; and,
   a first pin extending radially inwardly from said second collar and configured to be received within a first slot formed in a radially outer surface of said first collar.

15. The rotational coupling of claim 14 wherein said first slot is helical.

16. The rotational coupling of claim 14 wherein said stopping means includes a second pin extending radially inwardly from said second collar and configured to be received within a second slot formed in said radially outer surface of said first collar.

17. The rotational coupling of claim 16 wherein said first and second slots are helical.

18. The rotational coupling of claim 16 wherein said first and second pins are diametrically opposite one another.

19. The rotational coupling of claim 14 wherein said second collar defines a first plurality of teeth at one axial end configured to engage a second plurality of teeth disposed on an actuator ring upon movement of said actuator ring along said axis.

20. The rotational coupling of claim 19 wherein said stopping means includes means for moving said actuator ring into engagement with said second collar.

* * * * *